3,274,244
POLYFLUOROPOLYOXA-ALKANAMIDOALKYL COMPOUNDS

Alan K. Mackenzie, West Redding, Conn., assignor to E. I. du Pont de Nemours and Company, Wilmington, Del., a corporation of Delaware
No Drawing. Filed June 14, 1963, Ser. No. 287,780
3 Claims. (Cl. 260—561)

This invention relates to new and useful polyfluoropolyoxa-alkanamidoalkyl compounds. More particularly, it relates to polyfluoropolyoxa-alkanamidoalkanols and their corresponding phosphoric acid di-esters.

The present invention provides new fluorinated alcohols having the formula

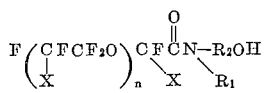

wherein X is a member of the group consisting of F and $CF_3$, $n$ is an integer from 2 to 6, $R_1$ is a member selected from the group consisting of hydrogen and $C_1$ to $C_4$ alkyl, and $R_2$ is a $C_2$ to $C_4$ alkylene.

It can be seen from the above formula for these new alkanols that the molecular chain contains in addition to a number of oxa groups an alkanamido group of the structure

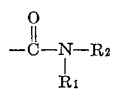

The following alkanols are typical of the alcohols of this invention, and they represent preferred embodiments of the invention:

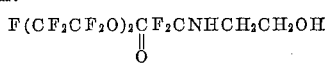

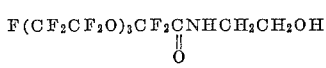

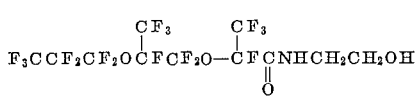

These new polyfluoropolyoxa-alkanamidoalkanols may be prepared by reacting the corresponding acid fluoride with an amino-alkanol having the formula $R_1NHR_2OH$ wherein $R_1$ and $R_2$ have the same significance as above, i.e.,

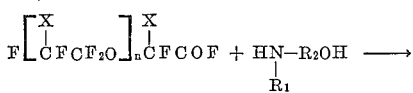

Representative amino-alkanols which may be employed in this reaction are 2-aminoethanol, 2-butylaminoethanol, 3-amino-1-propanol, 3-methylamino-1-propanol, 3-propylamino-1-propanol, 4-amino-1-butanol, 4-methylamino-1-butanol.

The acid fluoride for the above reaction may be prepared by the polymerization of tetrafluoroethylene oxide or hexafluoropropylene oxide in the presence of activated carbon or alkali fluorides. This process is further disclosed in U.S. Patent 3,088,958. A schematic sequence of reactions is:

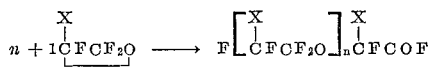

wherein X is F or $CF_3$.

The product is fractionally distilled to separate acid fluorides having specific $n$ values with the following characteristics:

Product

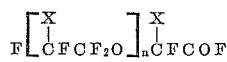

| $n$ | Boiling Range, °C./mm. Hg ||
| --- | --- | --- |
| | X=F | X=$CF_3$ |
| 2 | 65–68/760 | |
| 3 | 99–102/760 | |
| 4 | 134–138/760 | |
| 5 | 167–170/760 | 53–63/0.3 |
| 6 | 199–202/760 | 63–76/0.35 |

The polyfluoropolyoxa-alkanamidoalkanols of this invention can be converted to new phosphate di-esters which are useful as oil repellents for paper. Although it is known that certain long chain polyfluoroalkyl structures possess oil-repellent properties, it is quite surprising to find a high degree of oil-repellency in polyfluorinated compounds having repeating —$CF_2CF_2O$— groups.

The phosphate di-esters of this invention have the following formula

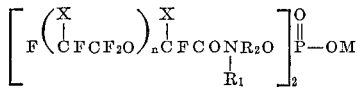

where X, $n$, $R_1$ and $R_2$ have the meaning set forth above, and M is a water-solubilizing cation. Typical of these water-solubilizing cations are those obtained when M is hydrogen, an alkali metal (Li, K, Na, etc.) as well as ammonium ions and substituted ammonium ions, such as diethanolamine and morpholine.

Specific illustrations of the phosphate esters coming within the scope of this invention are the following compounds:

(1) Bis[2 - (hendecafluoro-3,6-dioxaoctanamido)ethyl] phosphate:

(2) Bis[3-hendecafluoro-N-methyl-3,6-dioxaoctanamido) propyl] phosphate:

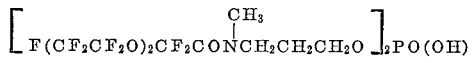

(3) Bis[2 - (pentadecafluoro-3,6,9-trioxahendecanamido) ethyl] phosphate:

(4) Bis[4 - (pentadecafluoro-3,6,9-trioxahendecanamido) butyl] phosphate:

(5) Bis[2 - (nonadecafluoro - 3,6,9,12-tetroxatetradecanamido)ethyl] phosphate:

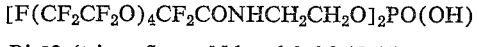

(6) Bis[2-(tricosafluoro-N-butyl-3,6,9,12,15-pentoxaheptadecanamido)ethyl] phosphate:

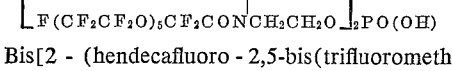

(7) Bis[2 - (hendecafluoro - 2,5-bis(trifluoromethyl)-3,6-dioxanonanamido)ethyl] phosphate:

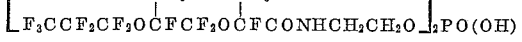

(8) Bis[4-(hendecafluoro-N - methyl - 2,5-bis(trifluoromethyl)-3,6-dioxanonanamido)butyl]phosphate:

(9) Bis[3-(tetradecafluoro-N - propyl - 2,5-8 - tris(trifluoromethyl)-3,6,9 - trioxadodecanamido)propyl]phosphate:

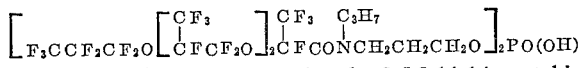

(10) Bis[2-(eicosafluoro-N - butyl - 2,5,8,11,14-pentakis-(trifluoromethyl)-3,6,9,12,15-pentoxaoctadecanamido)-ethyl]phosphate:

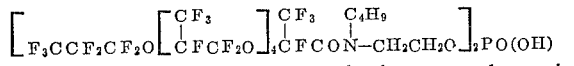

The specific compounds set forth above are shown in their free acid form. However, it will be quite obvious to one skilled in the art that these acids can be easily converted to their corresponding salts. In fact, the ammonium salts are preferred materials of this invention. Specific illustrations of preferred ammonium salts and other phosphate salts of this invention are as follows:

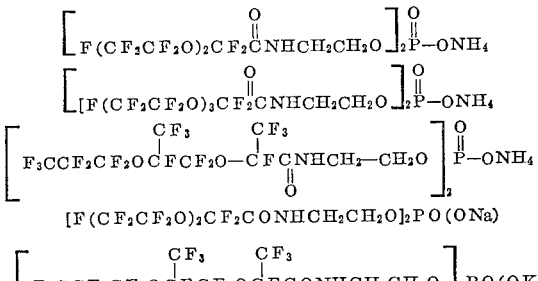

The novel phosphates of this invention may be prepared in one of several ways. In one method, two mols of the alkanol of this invention are reacted with one mol of phosphorus oxychloride or phosphorus oxybromide in the presence of a tertiary amine acid acceptor in the optional presence of a non-proton donating solvent. The reaction is preferably effected during the first stage, when the reactants are brought into contact, at 0° to 25° C. and then finished by heating the mixture at a reflux temperature of 50° to 150° C. The phosphorochloridate product of this reaction is then hydrolyzed to the required phosphate ester. Any tertiary amine that contains no other functional group may be used as an acid acceptor in the above reaction. Examples are pyridine, 2,6-dimethylpyridine, trimethylamine, triethylamine, tripropylamine, N,N-dimethylaniline, and the like. Specific satisfactory solvents are benzene, toluene, chlorobenzene, hexane, octane, mixed alkanes, 1-chlorobutane, carbon tetrachloride, propyl ether, butyl ether, dioxane.

The alkanols may also be reacted with phosphorus pentoxide to synthesize the invention phosphates. For this reaction three mols of the polyfluoropolyoxaalkanamidoalkanol are mixed with one mol of phosphorus pentoxide, and the mixture is heated between 30° and 200° C. without the use of a solvent or base. Both the mono- and the di-ester are formed. These esters are separated or the mixture of esters may be used as obtained.

Still another method for preparing the invention phosphates is to make the corresponding phosphites, oxidize the phosphites with nitrogen dioxide or chlorinate the phosphite and hydrolyze the product to the required phosphate. This series of steps may be summarized and illustrated as follows.

STEP 1.—FORMATION OF PHOSPHITE

Method A.—Ester-interchange with an available dialkyl phosphite:

$$2GOH + (RO)_2PHO \rightarrow (GO)_2PHO + 2ROH$$

wherein G represents

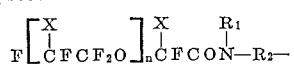

with X, n, R₁ and R₂ being the same as defined above and R being methyl, ethyl, or the like.

Method B.—Direct reaction with PCl₃:
(a) Preparation of (GO)₃P:

$$3GOH + PCl_3 \xrightarrow{t\text{-amine}} (GO)_3P + 3HCl$$

(b) Conversion to (GO)₂PHO:

$$(GO)_3P + H_3PO_3 \longrightarrow 3(GO)_2PHO$$

STEP 2.—OXIDATION OF PHOSPHITE TO PHOSPHOROCHLORIDATE $$(GO)_2PHO + Cl_2 \longrightarrow (GO)_2POCl + HCl$$

STEP 3.—HYDROLYSIS TO PHOSPHATE $$(GO)_2POCl + H_2O \xrightarrow{t\text{-amine}} (GO)_2PO(OH) + HCl$$

In any of the foregoing procedures the products may be isolated as the free acid (M=H) and then converted to an alkali metal (sodium or potassium), ammonium, or substituted ammonium salt by neutralization with the appropriate base. Convenient bases for obtaining substituted ammonium salts include methylamine, diethylamine, monoethanolamine, diethanolamine, triethanolamine, morpholine.

For a clearer understanding of the invention, the following specific examples are given. These examples are intended to be merely illustrative of the invention and not in limitation thereof. Unless otherwise specified, all parts are by weight.

*Example I.—2-(hendecafluoro-3,6-dioxaoctanamido) ethanol*

7.6 parts (0.125 mol) of ethanolamine is dried by distillation at 5 mm. Hg pressure and placed in a dry reaction vessel blanketed with dry nitrogen, and then 17.4 parts (0.05 mol) of hendecafluoro-3,6-dioxaoctanoic acid fluoride is gradually added. The ethanolamine is agitated during this addition, and the temperature is maintained between 60° and 70° C. The mixture is then heated at about 70° C. for 2 hours while agitation is continued. The reaction mixture is diluted with 1,1,2-trichlorotrifluoroethane and chloroform and washed successively with dilute hydrochloric acid, sodium bicarbonate solution, and water. The solvent is removed and 18.5 parts of 2-(hendecafluoro-3,6-dioxaoctanamido)ethanol product distilled under vacuum at 82° to 84° C. at 0.3 mm. to 0.35 mm. Hg pressure has $n_D^{25}=1.3376$ and $d_4^{25}=1.577$ and the following analysis.

Calculated for $C_8H_6F_{11}NO_4$: percent C=24.7; percent H=1.6; percent F=53.7; percent N=3.6. Found: percent C=24.4; percent H=1.9; percent F=54.0; percent N=3.6.

*Example II.—Ammonium bis[2-(hendecafluoro-3,6-dioxaoctanamido)ethyl]phosphate*

The 2-hendecafluoro-3,6-dioxaoctanamido)ethanol prepared in Example I is converted to the phosphite ester by heating with diethyl phosphite. Then the phosphite is oxidized with chlorine to phosphorochloridate which is hydrolyzed to the required phosphate. Details are as follows: A dry, nitrogen-blanketed reactor is charged with 16.3 parts (.033 mol) of 2-(hendecafluoro-3,6-dioxaoctanamido)ethanol, 2.07 parts (.015 mol) of diethyl phosphite [(RO)₂PHO] and 6.5 parts of m-xylene. The mixture is refluxed for 30 hours, and ethanol formed in the reaction is removed during the refluxing. The bis [(2-hendecafluoro - 3,6 - dioxaoctanamido)ethyl] phosphite is recovered by distilling the unreacted starting materials from the mixture at up to 156° C. at 0.1 mm. A small amount of solid was removed by filtration giving the product in 79% yield, $n_D^{25}$ 1.3544. The oxidation of the phosphite is effected by charging a reaction vessel with 3 parts of the phosphite suspended in 10 parts of 1,1,2-trichlorotrifluoroethane; chlorine gas is then bubbled into the agitated solution at room temperature until it is observed that chlorine is no longer being consumed. At the end of the reaction, nitrogen is bubbled through the reaction mass to draw off the excess chlorine before removing the solvent. The resulting phosphorochloridate is then mixed with 0.37 part of 2,6-lutidine, 0.44 part of water, and 9.2 parts of benzene and refluxed for about one hour. After cooling and settling, the bottom layer is isolated and washed with hot (ca. 80° C.) water. The residual water is removed by evaporation under vacuum and finally by distillation with added benzene. The product dissolved in 1,1,2 - trichlorotrifluoroethane is treated with ammonia gas to form ammonium bis[2-hendecafluoro - 3,6 - dioxaoctanamido)ethyl] phosphate which remains as a straw-colored viscous liquid when the solvent is removed. The identity of the product is confirmed by the following analysis.

Calculated for $C_{16}H_{14}F_{22}N_3O_{10}P$: Percent C=22.42; percent H=1.7; percent F=48.8; percent N=4.9; percent P=3.6. Found: Percent C=22.1; percent H=2.0; percent F=47.3; percent N=4.8; percent P=4.0.

*Example III*

Following the procedure of Example I, 7.63 parts (0.125 mol) of ethanolamine was placed in a dry reaction vessel and 23.2 parts (0.05 mol) of pentadecafluoro-3,6,9-trioxahendecanoic acid fluoride was gradually added. After heating the resulting mixture as before, the reaction mixture was diluted with 1,1,2-trichlorotrifluoroethane and chloroform and washed with dilute hydrochloric acid, sodium bicarbonate solution, and water. Evaporation of the solvent and distillation of the residue gave 24.23 parts (96% yield) of 2-(pentadecafluoro-3,6,9-trioxahendecanamido)ethanol, B.P. 92° C., at 0.35 mm., $n_D^{25}$ 1.3254, $d_4^{25}$ 1.677.

*Analysis.* — Calculated for $C_{10}H_6F_{15}NO_5$: Percent C=23.8; percent H=1.2; percent F=56.4; percent N=2.8. Found: Percent C=23.9; percent H=1.4; percent F=56.2; percent N=2.8.

*Example IV*

Using the procedure of Example II, 11.1 parts (0.022 mol) of 2 - (pentadecafluoro-3,6,9-trioxahendecanamido) ethanol was caused to react with 1.38 parts (0.01 mol) of diethyl phosphite in 5 parts m-xylene at 159–162° C. for 6 hours. The unreacted starting materials were then removed by heating the mixture up to 155° C. at 0.2 mm. as described before to give 6.14 parts (58% yield) of bis[2 - (pentadecafluoro-3,6,9-trioxahendecanamido) ethyl] phosphite, $n_D^{25}$ 1.3462.

*Analysis.*—Calcd. for $C_{20}H_{11}F_{30}N_2O_{11}P$: C, 22.8; H, 1.05; N, 2.7. Found: C, 22.6; H, 1.2; N, 2.4.

The phosphite ester prepared above was then oxidized with an excess of chlorine as described in Example II. After hydrolysis of the intermediate phosphorochloridate and drying of the crude acid as in Example II, the acid was dissolved in 1,1,2-trichlorotrifluoroethane and treated with an excess of ammonia gas as before, giving solid ammonium bis[2-(pentadecafluoro-3,6,9-trioxahendecanamido)ethyl] phosphate in 85% yield.

*Analysis.*—Calculated for $C_{20}H_{14}F_{30}N_3O_{12}P$: Percent C=22.1; percent H=1.3; percent F=52.4; percent N=3.9. Found: Percent C=22.1; percent H=1.6; percent F=49.8; percent N=3.9.

*Example V*

Using the procedure of Example I, 1.83 parts (0.03 mol) of ethanolamine were caused to react with 6.96 parts (0.012 mol) nonadecafluoro-3,6,9,12-tetraoxatetradecanoic acid fluoride. Isolation and distillation of the product as before gave 7.17 parts (96% yield) of 2-(nonadecafluoro - 3,6,9,12-tetraoxatetradecanamido)ethanol, B.P. 91–97° C. at 0.15 mm. (102–105° C. at 0.4 to 0.5 mm.), $n_D^{25}$ 1.3177, $d_4^{25}$ 1.707.

*Analysis.* — Calculated for $C_{12}H_6F_{19}NO_6$: Percent C=23.3; percent H=1.0; percent F=58.1; percent N=2.3. Found: Percent C=23.0; percent H=0.8; percent F=56.6; percent N=2.2

*Example VI*

Using the procedure of Example II, 13.66 parts (0.022 mol) of 2-(nonadecafluoro-3,6,9,12-tetraoxatetradecanamido)ethanol were caused to react with 1.38 parts (0.01 mol) of diethyl phosphite in 10 parts m-xylene at 159–162° C. for 9 hours. The product was stripped of unreacted starting materials at 150° C. at 0.2 mm., giving bis[2 - (nonadecafluoro - 3,6,9,12 - tetraoxatetradecanamido)ethyl]phosphite, yield 4.96 parts (39%), $n_D^{25}$ 1.3307, $d_4^{25}$ 1.8793.

*Analysis.*—Calculated for $C_{24}H_{11}F_{38}N_2O_{13}P$: C, 22.4; H, 0.86; N, 2.2. Found: C, 22.4; H, 1.1; N, 2.2.

The phosphite ester prepared in the previous paragraph was oxidized with an excess of chlorine as described in Example II. After hydrolysis of the intermediate phosphorochloridate and drying of the crude acid, as described in Example II, the acid was dissolved in 1,1,2-trichlorotrifluoroethane and treated with an excess of gaseous ammonia, giving solid ammonium bis-[2-(nonadecafluoro - 3,6,9,12 - tetraoxatetradecanamido) ethyl] phosphate in 86% yield.

*Analysis.*—Calculated for $C_{24}H_{14}F_{38}N_3O_{14}P$: Percent C=21.8; percent H=1.1; percent F=54.7; percent N=32.; percent P=2.4. Found: Percent C=21.7; percent H=1.4; percent F=52.0; percent N=3.0; percent P=2.5.

*Example VII*

Using the procedure of Example I, hendecafluoro-2,5-bis(trifluoromethyl)-3,6-dioxanonanoic acid fluoride was caused to react with ethanolamine to give liquid 2-(hendecafluoro - 2,5 - bis(trifluoromethyl) - 3,6 - dioxanonanamido)ethanol which was isolated as in Example I.

A mixture of 12.05 parts (0.0223 mol) of 2-(hendecafluoro - 2,5 - bis(trifluoromethyl)-3,6-dioxanonanamido) ethanol, 1.38 parts (0.01 mol) of diethyl phosphite and 5 parts m-xylene was heated as in Example II for 6.5 hours at 140°–149.5° C. The product was stripped of unreacted starting materials at 135°–147° C. at 0.1–0.18 mm., giving 9.43 parts (84% yield) of liquid bis[2-(hendecafluoro - 2,5 - bis(trifluoromethyl)-3,6-dioxanonanamido) ethyl]phosphite.

*Analysis.*—Calculated for $C_{22}H_{11}F_{34}N_2O_9P$: C, 23.5; H, 0.99; N, 2.49. Found: C, 23.5; H, 1.0; N, 2.3.

The phosphite ester prepared above was oxidized with excess chlorine as described in Example II. After hydrolysis of the intermediate phosphorochloridate and drying of the crude acid as described in Example II, a suspension of the crude acid in benzene was treated with an excess of gaseous ammonia as before, giving 2.45 parts (76% yield) of solid ammonium bis[2-(hendecafluoro - 2,5 - bis(trifluoromethyl)3,6 - dioxanonanamido) ethyl] phosphate.

*Analysis.*—Calculated for $C_{22}H_{14}F_{34}N_3O_{10}P$: percent C=22.8; percent H=1.2; percent F=55.8; percent N=3.6; percent P=2.7. Found: percent C=23.9; percent H=1.6; percent F=54.5; percent N=3.6; percent P=2.5.

*Example VIII*

Under anhydrous conditions, a mixture of 5.39 parts (0.01 mol) of 2-(hendecafluoro-2,5-bis(trifluoromethyl)-3,6-dioxanonanamido)-ethanol as prepared in Example VI, 1.07 part (1.14 mols) dry 2,6-lutidine and 5.7 parts dry benzene was added slowly with agitation to an agitated mixture of 0.78 part phosphoryl chloride (POCl₃) and 5.70 parts dry benzene at 5–10° C. The mixture was heated under reflux for one hour, then cooled to 50° C. A mixture of 0.535 part 2,6-lutidine and 0.63 part water was then added. The resulting mixture was heated under reflux for one hour, then cooled. The mixture separated into three layers which were separated. The bottom layer was extracted with hot water, then dried by azeotropic distillation of the water with benzene. An excess of gaseous ammonia was slowly added to the hot benzene mixture. The solvent was then evaporated, giving 3.99 parts (69% yield) of solid ammonium bis[2-(hendecafluoro - 2,5 - bis(trifluoromethyl)-3,6-dioxanonanamido) ethyl] phosphate, identical to that prepared in Example VII.

As previously mentioned, oil-repellancy may be achieved by applying the phosphates of this invention to a variety of solid materials such as textile fabric, textile yarn, leather, paper, plastic sheeting, wood, ceramic clays, as well as manufactured articles made therefrom, for instance, wearing apparel, wall paper, paper bags, cardboard boxes, porous earthenware, etc. The new compounds are well adapted for imparting oil-repellancy to paper and paper products by treating pulp with the oil-repellency compound at the machine chest or head box stage in paper manufacture.

The treatment of water-insoluble materials with the invention compounds to render materials oil-repellent may be done by padding, exhaustion, spraying, or brushing using aqueous solutions of the agents. The amount of oil-repellent deposited on the material will vary from 0.03% to 3% by weight of the material. The preparation of the aqueous solutions may be facilitated by first dissolving the phosphate agent in an organic solvent such as acetone, methanol, ethanol, or isopropanol or mixtures of these solvents, followed by dilution with water. Alternately a solution of the free acid phosphate in an organic solvent may be diluted with an aqueous amine or ammonia solution.

A preferred procedure in treating materials to render them oil-repellent is to employ in combination with the invention phosphate a water-soluble polymer containing cationic nitrogen whereby to endow said material with the power of exhausting the phosphate from the aqueous bath. Examples of cationic polymeric materials suitable for use with the invention phosphates are the polymers or copolymers of quaternary derivatives or acid salts of esters of a dialkylamino alkanol and acrylic acid or methacrylic acid, water-soluble urea resins possessing cationic N-atoms, melamine-formaldehyde resins possessing cationic N-atoms, the quaternized or acid salts of polymerized ethyleneimine, and cationically-modified nitrogen-containing starches. The quantity of cationic agent added may vary from 0.05% to 10% on the weight of the material being treated, while that of the phosphate, as already mentioned, may be from 0.03% to 3%. The order of treatment of the solid material with the polyfluoropoly-oxa-alkanamidoalkyl phosphate and polymeric cationic N-containing material is immaterial, provided care is taken to eliminate or to minimize contact between the two agents except when either of them is in contact with the solid material being treated. This means that the cationic agent may be applied first and then after a little time to permit complete exhaustion of the agent onto the material being treated, the fibers of a pulp or textile for example, the polyfluoropolyoxa phosphate may be applied. Or the reverse sequence may be followed.

To demonstrate the oil-repellent properties of the compounds of this invention, the following tests were carried out: To an agitated dispersion of 4 g. (dry basis) of unbleached kraft pulp in 300 ml. of water is added 5 g. of an aqueous 0.4% solution of polymerized 2-(diethylmethylammonio)ethyl methacrylate methosulfate (0.5% of the polymer on the dry weight of the pulp to exhaust the oil-repellent phosphate ester onto the pulp fibers). Agitation is continued for five minutes and then a quantity of the phosphate ester in the form of its ammonium salt dissolved in an aqueous or an acetone-water solution is added. (This quantity varies from 0.05% on the dry weight of the pulp to 0.2%.) After additional stirring for five minutes the treated pulp is poured into one gallon of water in an 8" x 8" handsheet mold fitted with a 150-mesh screen, drained, pressed, and dried on a rotary drier at about 180° F.

Oil-repellency of the treated paper is demonstrated by placing drops of peanut oil on the surface of the paper and noting the time required for the first noticeable mark of penetration of the oil to appear on the underside of the sheet. From these data, the lowest concentration of phosphate ester which repels the peanut oil for at least 30 minutes is noted. The untreated paper is penetrated immediately by the oil. A summary of the results of this repellency test is given in Table 1.

TABLE 1.—OIL-REPELLENCY OF PAPER TREATED WITH PHOSPHATE ESTERS

| Phosphate ester, ammonium salt of: | Amount of ester to repel peanut oil for at least 30 minutes, in percent on wt. of paper |
|---|---|
| Bis[2 - pentadecafluoro - 3,6,9 - trioxahendecanamide)ethyl]phosphate | 0.07 |
| Bis[2 - pentadecafluoro - 3,6,9 - trioxahendecanamido)ethyl]phosphate | 0.07 |
| Bis[2 - (nonadecafluoro - 3,6,9,12 - tetroxatetradecanamido)-ethyl]phosphate | 0.08 |
| Bis[2 - (hendecafluoro - 2,5 - bis(trifluoromethyl) - 3,6 - dioxanonanamido)ethyl]phosphate | 0.09 |

In addition to forming the phosphoric acid esters, the new group of polyfluoropolyoxa-alkanamidoalkanols are readily esterified with the acid halides or anhydrides of carboxylic and sulfonic acids to form the corresponding carboxylic and sulfonic acid esters. These alkanols also readily react with cyanuric chloride and like compounds.

Also, the new group of phosphate esters are useful as surface active agents. These phosphates are dispersing agents in the polymerization of haloolefins such as tetrafluoroethylene and chlorotrifluoroethylene, where dispersions of the polymers of these olefins are attained with difficulty in aqueous media in the presence of ordinary dispersing agents.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A polyfluoropolyoxa-alkanamidoalkanol of the formula

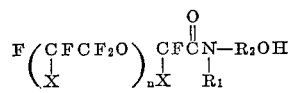

wherein X is a member of the group consisting of F and CF₃, $n$ is an integer from 2 to 6, $R_1$ is a member selected from the group consisting of hydrogen and $C_1$ to $C_4$ alkyl, and $R_2$ is a $C_2$ to $C_4$ alkylene.

2. A compound of the formula

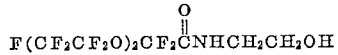

3. A compound of the formula $$F(CF_2CF_2O)_3CF_2\overset{O}{\overset{\|}{C}}NHCH_2CH_2OH$$

References Cited by the Examiner
UNITED STATES PATENTS

| | | | |
|---|---|---|---|
| 2,743,297 | 4/1956 | Husted et al. | 260—561 |
| 3,019,261 | 1/1962 | Pascal | 260—561 |
| 3,083,224 | 3/1963 | Brace et al. | 260—461 |
| 3,094,547 | 6/1963 | Heine | 260—461 |
| 3,125,599 | 3/1964 | Warnell | 260—561 |

WALTER A. MODANCE, *Primary Examiner.*

CHARLES B. PARKER, *Examiner.*

FRANK M. SIKORA, NATALIE TROUSOF,
*Assistant Examiners.*